United States Patent [19]

Symborski et al.

[11] 4,163,653
[45] Aug. 7, 1979

[54] METHOD AND APPARATUS FOR FORMING AND COLLECTING DISCRETE FIBERS AND/OR STRANDS

[75] Inventors: Alex P. Symborski, Anderson; Ray M. Fulmer, Aiken, both of S.C.; David W. Thomas, Newark, Ohio

[73] Assignee: Owens-Corning Fiberglas Corporation, Toledo, Ohio

[21] Appl. No.: 937,380

[22] Filed: Aug. 28, 1978

[51] Int. Cl.² ............................................. C03B 37/02
[52] U.S. Cl. ........................................ 65/2; 65/11 R; 65/11 W; 83/913
[58] Field of Search ..................... 65/2, 11 R, 11 W; 83/913; 226/91, 92

[56] References Cited

U.S. PATENT DOCUMENTS

| 3,539,317 | 11/1970 | Smith | 65/11 W |
| 3,771,981 | 11/1973 | Sears | 65/11 R X |
| 3,815,461 | 6/1974 | Genson | 83/913 X |
| 4,071,339 | 1/1978 | Griffiths | 65/11 W |
| 4,071,341 | 1/1978 | Bohy et al. | 65/11 W |

Primary Examiner—Robert L. Lindsay, Jr.
Attorney, Agent, or Firm—Ronald C. Hudgens; Philip R. Cloutier; Greg Dziegielewski

[57] ABSTRACT

Method and apparatus for forming discrete segments of fibrous glass comprises supplying a plurality of streams of molten glass; attenuating the streams into filaments and cutting the continuous filaments into discrete segments by a forming means; positioning a delivery means having a first collection zone and a second collection zone spaced from the first zone to receive said discrete segments; controlling said forming means to operate at a first speed or a second speed slower than the first speed; directing the discrete segments to said first zone when said forming means is operated at said first speed and to said second zone when said forming means is operated at said second speed.

5 Claims, 7 Drawing Figures

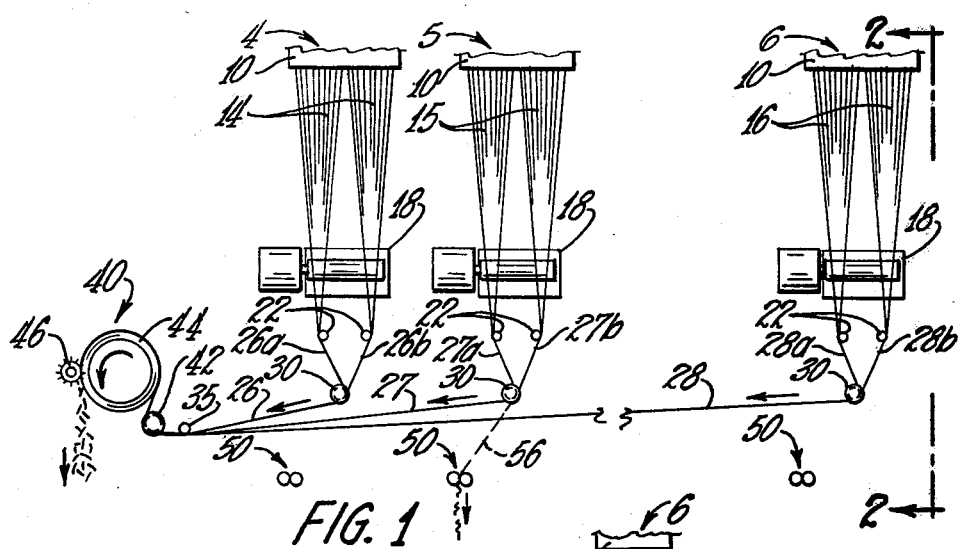
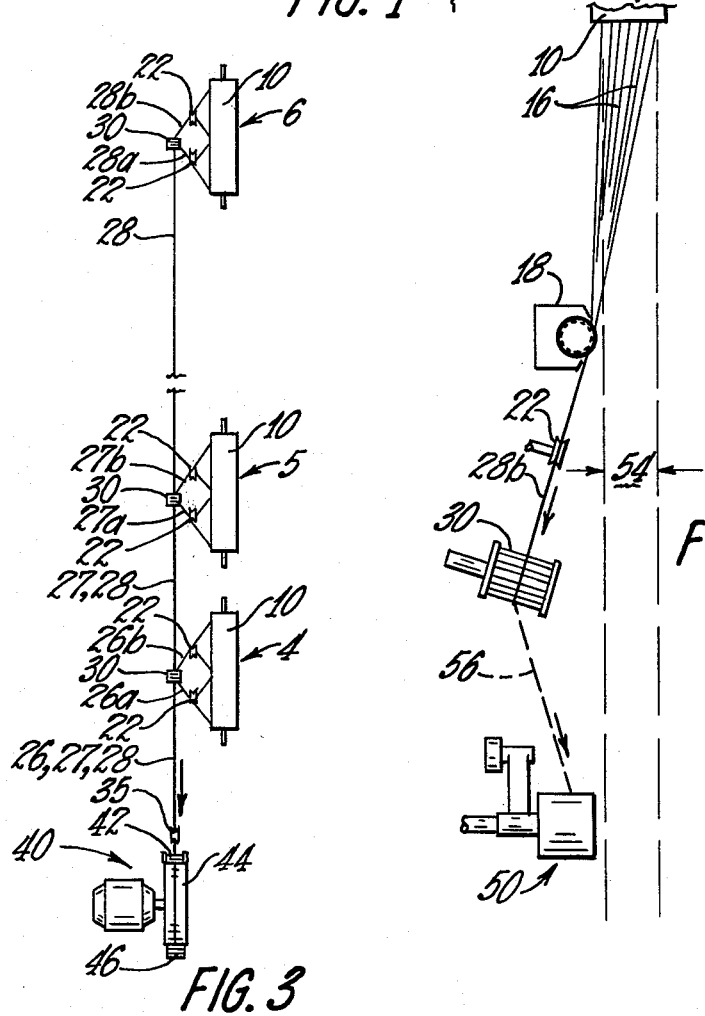

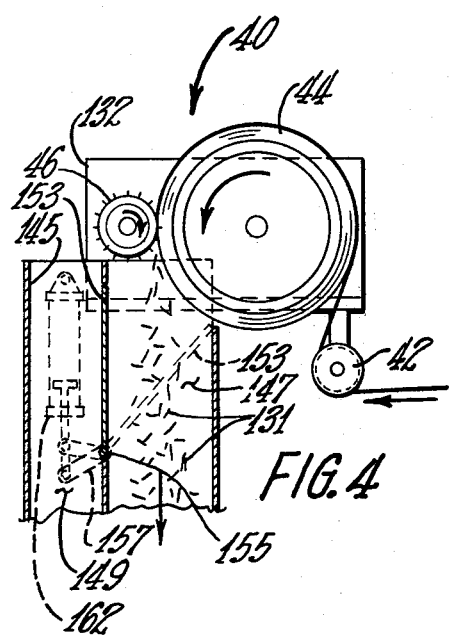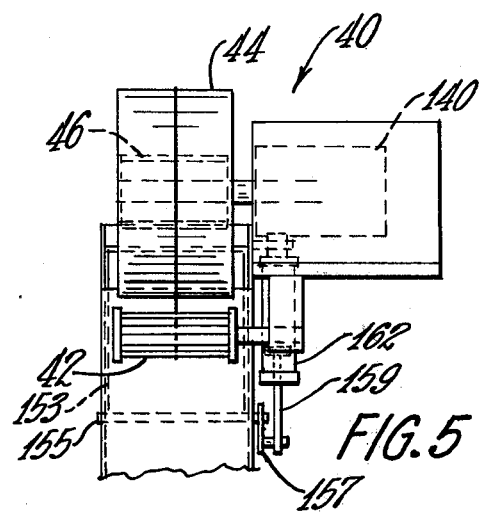

METHOD AND APPARATUS FOR FORMING AND COLLECTING DISCRETE FIBERS AND/OR STRANDS

BACKGROUND OF THE INVENTION

Many times it is desirable to form a strand consisting of a very large number of filaments. Generally, a number of smaller strands consisting of a plurality of filaments in each are combined in a roving process to produce a single large strand or roving of a large number of filaments. To accomplish this, filaments are pulled from a feeder and wound upon a forming tube being rotated by a winder to form a subpackage. Such subpackages are positioned as a group to remove each of the strands therefrom to combine the substrands into a larger strand by the action of yet another winder as is known in the art. Or the combined strand can be pulled by the action of a cot wheel and a chopper to deliver a large number of continuous filaments to be cut into discrete segments.

Generally, a reduction in the equipment utilized in the steps employed in producing such a strand containing a large number of filaments can lead to improved efficiencies and reduced costs. This is especially practical wherein all of the filaments can be attenuated by the action of a single attenuation means located on a single level of a forming room.

Systems for producing chopped glass segments from a plurality of spaced apart bushings have been employed before. But, due to the orientation of the bushings, coating applicators, gathering shoes, idler rolls, and scrap pull rolls and the like, a strand break out could disrupt at least a portion of the remaining forming operation, if an intermediate forming section was disrupted.

Furthermore, in the production of discrete fibers or chopped strand, it is desirable to concomitantly pull continuous glass fibers from a plurality of spaced apart feeders adapted to supply a strand or plurality of strands to the chopper wherein the cot wheel of the chopper acts as a pull wheel to attenuate the streams of molten material issuing from the feeders into filaments. In drawing the filaments from a plurality of bushings to be advanced through the chopper, it is possible to maintain production from a number of bushings even though one or more bushings may be disrupted. With the bushings and other apparatus oriented to provide continuous operation in spite of a disruption of one or more bushings, it is desirable to have the operator restart the disrupted feeder to again supply filaments to the chopper in the absence of disrupting the other bushings.

To accomplish this, the filaments must be continuously attenuated from all bushings still in operation. Thus, the chopper can not be stopped. However, with high speed operations it is difficult and sometimes undesirable to try to rethread the chopper at high speed. Therefore, the rotational speed of the chopper must be reduced to allow the operator to rethread the strand but yet maintain a speed sufficient to attenuate filaments from the other bushings to prevent substantial disruptions therein.

At the reduced speed, however, the discrete fibers formed may not be of the proper size or quality desired. To insure that the secondary or waste discrete fibers are not placed in the receptacle containing the desired chopped strand/fibers it is necessary that the secondary fibers be directed elsewhere.

SUMMARY OF THE INVENTION

This invention pertains to a method and apparatus for forming and collecting discrete segments of fibrous glass comprising supplying a plurality of streams of molten glass; attenuating the streams into filaments and cutting the continuous filaments into discrete segments by a forming means; positioning a delivery means having a first collection zone and a second collection zone spaced from the first zone to receive said discrete segments; controlling said forming means to operate at a first speed or a second speed slower than the first speed; directing the discrete segments to said first zone when said forming means is operated at said first speed and to said second zone when said forming means is operated at said second speed.

DESCRIPTION OF THE DRAWINGS

FIG. 1 is a front elevational view of the multifeeder forming system according to the principles of this invention.

FIG. 2 is a side view of the system showing FIG. 1.

FIG. 3 is a plan view of the forming system shown in FIG. 1.

FIG. 4 is a semi-schematic front elevational view of a chopper according to the principles of this invention.

FIG. 5 is a partial side view of the system shown in FIG. 4.

DESCRIPTION OF THE PREFERRED EMBODIMENTS

Figure 6:
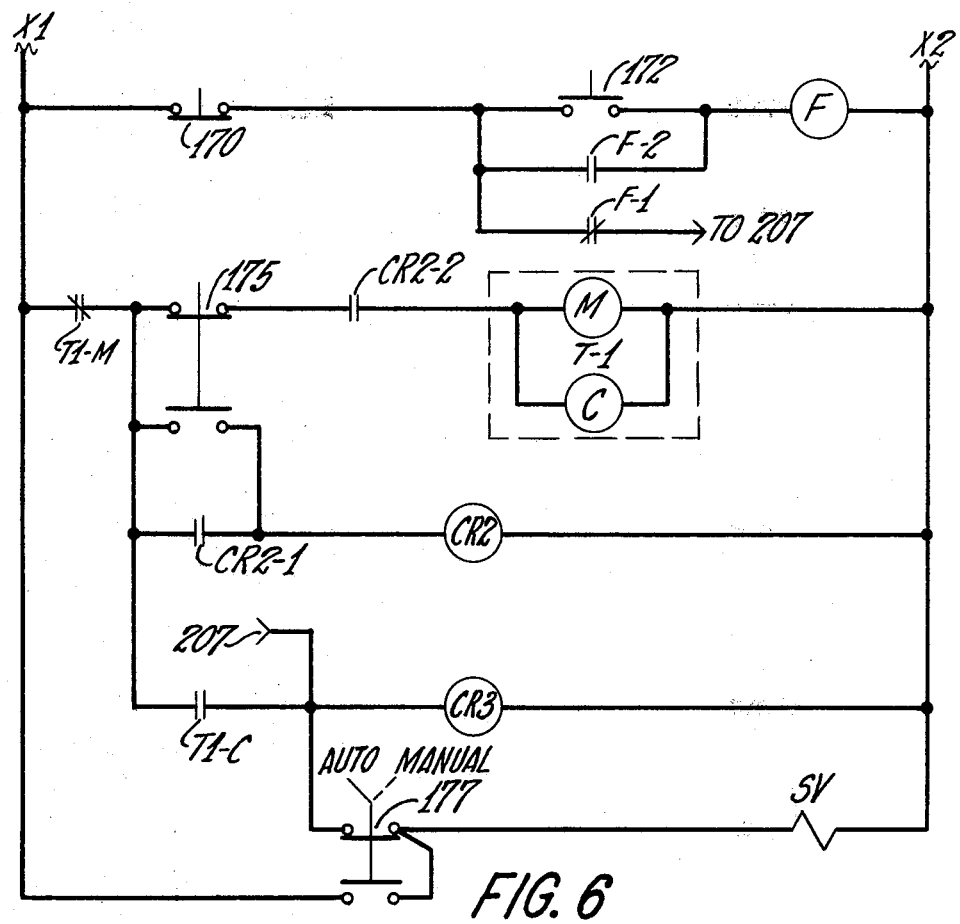
FIG. 6 is a portion of an electrical control diagram for the apparatus of FIGS. 4 and 5.

As shown in FIGS. 1, 2, and 3, the forming system is comprised of spaced apart continuous filament forming sections 4, 5, and 6 which are associated with a primary attenuation means or chopped strand forming means 40. Thus, a single attenuation means is adapted to attenuate and advance all of the filaments from all of the forming sections. As such, the primary attenuation means 40 can be a winder, pull wheel, or a chopper for forming discrete fibers or chopped strand as is known in the art.

As shown, each forming section 4, 5, and 6 is comprised of a stream feeder or bushing 10, size or coating applicator 18, gathering shoes or guide means 22, an idler roll or guide means 30 and secondary attenuation means 50, all of which can be of the type well known in the glass fiber forming art.

In operation, each of the feeders 10 supply a plurality of streams of molten glass to be attenuated into filaments by the action of the primary attenuation means 40 or secondary attenuation means 50. In any glass fiber forming operation, occasionally, some of or all of the filaments from any bushing will break and the attenuation process will be halted. During restart, "bead down" can occur wherein the streams of molten material leave the feeder as beads of molten glass. If left unattended in a free fall condition, the beads or streams will move along a path defining a vertically extending zone beneath feeder 10.

To establish a continuous and efficient operation, it is imperative that such forming equipment as the applicators 18, gathering shoes 22, idler rolls 30, and scrap pull rolls or secondary attenuation means 50 be positioned external to such zone to keep such equipment out of the free-fall path of the beads or streams.

As shown in FIG. 2, applicator 18, gathering shoe 22, idler roll 30, and secondary attenuation means 50 are laterally spaced to the same side of zone 54. Generally, it is preferred that such equipment be on the side of the zone 54 opposite the side of the zone where the operator is normally positioned. With such an orientation, the operator has easy access to the bottom region of the feeder while permitting easy access to coating applicator 18, gathering shoe 22, idler roll 30 and scrap pull roll 50.

During production, feeders 10 of forming sections 4, 5, and 6 supply a plurality of streams of molten glass to be attenuated into continuous filaments 14, 15, and 16. Each of such filaments are advanced along a path external to the zone 54 of each of the plurality of forming sections. Each of the applicators 18 is fixed external to the zone and laterally spaced therefrom such that the applicator surface, which can be a rotatable roll wet with a suitable liquid size and/or coating, as is known in the art, is located laterally spaced from the zone. The liquid is applied to the filaments at a region laterally spaced from the zone.

Gathering shoes 22 are laterally spaced farther from the zone in the same direction as applicators 18 to bring the filaments into contact with the applicator roll. Gathering shoes 22 further serve to gather the filaments into a substrand and guide the strand along a path external to the zones 54. From gathering shoes 22 the substrands 26a and 26b, 27a, 27b, 28a, and 28b are advanced to idler rolls 30 associated therewith to form strands 26, 27, and 28 respectively.

Strands 26, 27, and 28 are advanced to second guide means 35 which is laterally spaced from the same side of zones of all of the forming sections 4, 5, and 6. Gathering shoes 22 can be considered a first guide means or the combination of gathering shoes 22 and idler rolls 30 can work in conjunction as a first guide means. The second guide means 35 is positioned in a horizontal plane below the horizontal plane or zone containing the first guide means such that the strands 26, 27, and 28 are maintained in a spaced apart relationship until such strands substantially reach second guide means 35. As shown in FIG. 1, second guide means 35 is located in a horizontal plane beneath the horizontal plane containing idler rolls 30 of sections 4, 5, and 6. With the strands 26, 27 and 28 remaining in a spaced apart relationship until approximately reaching guide means 35 it is easier to restart individual strands than if the strands were confined prior to that point.

Strands 26, 27, and 28 are then advanced as a larger strand to primary attenuation means 40. As shown in FIG. 1, primary attenuation means 40 is comprised of an idler roll 42, a cot roll 44, and a cutter roll 46 having a plurality of radially projecting cutting edges as found in choppers well known in the art. Cot roll 44 acts as a pull wheel and idler roll 42 is positioned to bring the strands into engagement with the surface of cot roll 44 in a non-slipping engagement such that all of the streams from all of the bushings 10 are simultaneously attenuated into filaments. As the strand contacting the surface of cot roll 44 passes through the region where cutter roll 46 pierces the elastomeric surface of cot roll 44 the continuous glass filaments or strands are cut into discrete segments.

As shown, second guide means 35 is positioned such that strands 26, 27, and 28 are all advanced along paths external to each of the zones 54 of sections 4, 5, and 6. Thus, if one of the sections should be disrupted at any time, the streams or beads thereof will not contact the remaining advancing strands and disrupt the entire operation.

During start-up or restart, the filaments can be normally in contact with the applicator 18, gathering shoe 22 and idler roll 30, with the strand being advanced as waste material since the secondary attenuation means 50 is normally of the type that the filaments are pulled at a lower speed than by the primary attenuation means.

As shown in FIG. 2, the secondary attenuation means or scrap rolls 50 are also positioned or laterally spaced to the same side of zone 54 as applicator 18. However, the secondary attenuation means is positioned closer to zone 54 than idler roll 30, such that the waste strand 56 is advanced downward and forward in the absence of contacting, for example strand 28, when an interior forming section, such as section 5, employs secondary attenuation means 50 to preclude the fouling of strands and/or interfilament abrasion.

It is preferred that the scrap rolls 50 be located closer to zone 54 than idler roll 30 because if the secondary attenuation means 50 was located a greater distance away from zone 54 in the same direction as idler 30 the operator would have to reach in past the high-speed advancing strands and bring the strand, which is about to be restarted, over or through the array of advancing strands which is not desirable.

Furthermore, each of the secondary attenuation means 50 is laterally spaced from its associated zone 54 such that, in systems employing substrands as shown herein, one of the substrands can break out and bead down without disrupting the pulling of the fibers from the other portion of the bushing 10.

Is is preferred that the feeders 10 of the forming sections 4, 5, and 6 be spaced apart and located substantially in a first, common vertical plane with each of the applicators 18 being located substantially in a second, common vertical plane laterally spaced from the first vertical plane. Gathering shoes 22 and idler rolls 30 are oriented such that they have substantially parallel axes of rotation such that the strand advancing downward between the surface of the applicator 18 and surface of idler rolls 30 moves in a third plan oblique to the first and second vertical planes with the third oblique plane being tangent to the surface of the applicator 18. That is, the feeders, applicators, gathering shoes, idler rolls, and secondary guides are positioned such that the advancing strands are external to all the zones 54 of the forming sections 4, 5, and 6 to promote continuous operation in spite of a break out in any of the forming sections.

It is preferred that idler rolls 30 and 42 be of the type wherein a plurality of substantially parallel, spaced apart cylindrical rods are fastened to at least one flange substantially perpendicular thereto adapted to be journally mounted for rotation along an axis substantially parallel to the rods. It is believed that, wherein "D" is equal to the diameter of the base circle through which the axes or center lines of the rods pass, "d" is equal to the outside diameter of the cylindrical rods, and "S" is equal to the distance measured along the base circle between the center lines of adjacent rods. Said idler roll should be fabricated according to the following parameters: $d \leq 0.08D$ and $S \geq 1.6d$. And it is preferred that $0.08D \geq d \geq 0.06D$. Furthermore, it is preferred that $2.0d \geq S \geq 1.6d$.

In idler rolls having a central cylindrical shaft or sleeve extending along the axis of rotation located between the cylindrical rods it is preferred that the outside diameter of the central sleeve or shaft, "X", be $\leq 0.65D$.

It has been found that idler rolls fabricated according to the foregoing parameters exhibit a substantially reduced tendency for the strands having a liquid thereon to "roll wrap". It is believed that the spacing between adjacent rods and the spacing between the cylindrical rods and the central sleeve, if any, promotes an air movement over the surface of the rods effective to wipe the surface of the rods clean to produce an idler roll having a reduced tendency to roll wrap.

As shown in FIGS. 4 and 5, first rotatable means or cot roll 44 is journaled in frame 132, and cutter roll or second rotatable member 46 is also journaled in frame 132. Chopper or primary attenuation means 40 serves to attenuate the streams of molten material into filaments through the action of the cot roll 44 which acts as a pull wheel and cut or chop the continuous filaments into discrete segments.

Drive means 140, such as a conventional electrical motor, is adapted to rotate cot roll 44 and cutter roll 46, and recepticle or delivery means 145 is positioned to receive the chopped strand 31 as the chopped strand leaves the forming means 40.

Recepticle 145 is comprised of a first zone 147 spaced from a second zone 149 by means of wall 151. Movable element 153 is pivoted at one end of wall 151 by means of rod 155 joined thereto and journaled in the side walls of the receptacle 145. Attached at one end of rod 155 is arm 157 which is attached at the opposite end to shaft 159 of motive means or air cylinder 161.

As shown in FIG. 4, movable element 153 is adapted to direct the chopped strand 31 to the second zone 149 of recepticle 145 when the shaft 159 is retracted. When the air cylinder 61 is energized to extend shaft 159, movable element 153 retracts into the normal operating position to allow the chop strand 31 to move to and through first zone 147. Generally, first zone 147 is adapted to direct the chop strand a suitable shipping container, while second zone 149 is in communication with a suitable scrap collection system.

During the operation of such multifeeder wet chop systems, it is desirable to maintain production from the feeders 10 in spite of process interruptions, such as break-outs and the like, from one of the other feeders. With high speed operations, it may be difficult and undesirable to rethread the disrupted feeder with the system operating at full speed. But the forming means or chopper 40 cannot be stopped, otherwise the other feeders will be interrupted. Therefore, the speed of the chopper, the cot roll and/or cutter roll must be reduced to a second speed, slower than the first speed, to allow the operator to thread-up the strand to be restarted and yet maintain the other bushings in an operational mode.

When the system is operating at the second or slower speed, the filaments and/or chopped strand formed may be of the type or quality unacceptable for inclusion with the desired product. To prevent the secondary chop strand or waste from contaminating the desired product, delivery means or recepticle 145 is adapted to direct the chopped strand to the first zone 147 when the forming means 40 is operating at the first speed and to direct the chopped strand 131 into the second zone 149 when the attenuation/forming means 40 is operating at the second or slower speed. This is accomplished by means of a control system coordinating the drive means 140 and the delivery means 145.

During operation when the operator is about to rethread a strand from a disrupted bushing, the operator activates the control system which reduces the speed of the forming system 40 and energizes air cylinder 161 to shift movable element 153 to direct the waste into the second zone 149. To prevent the system from running at the second speed for too great a length of time which may set up thermal imbalances in the other normally operating feeders, the control system is adapted to automatically shift back into the normal or high speed mode after a predetermined length of time. That is, a system is provided wherein normal production resumes after the strand has been restarted in the absence of further actions by the operator.

Figure 7:
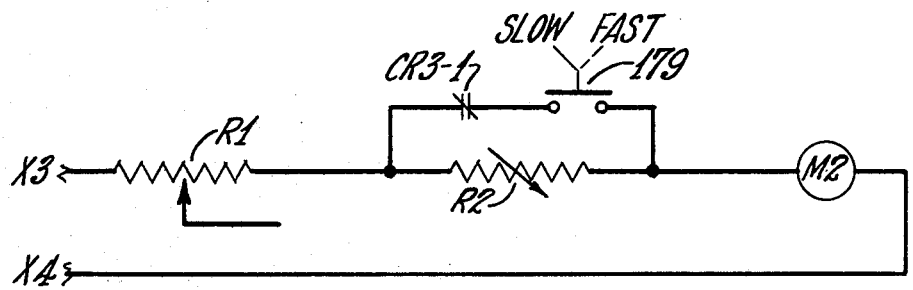
FIG. 7 is a portion of the electrical control diagram for the apparatus of FIGS. 4 and 5.

The control means which interconnects the motor 140 with the air cylinder 161 and thus movable element 53 to direct the filaments as described is schematically set forth in FIGS. 6 and 7 in the unenergized state. Leads X1 and X2 are adapted to be connected to a suitable source of electricity. With stop switch 170 in the closed position and start switch 172 momentarily depressed, coil F is energized which closes contacts F2 to lock in the magnetic starter coil F located in motor 40. Also when coil F is energized, contacts F-1 open thus denergizing relay CR3 and scrap chute solenoid valve SV, assuming that auto/manual switch 177 is in the automatic position.

Solenoid valve SV is connected to a suitable source of pressurized air (not shown) and to the air cylinder 61. When the solenoid valve SV is denergized, movable element 153 is in the retracted position such that a direct path to first zone 147 for chopped strand 131 is established.

Referring to FIG. 6, it can be seen that when relay CR3 is denergized, contacts CR3-1 are in the closed position connected in series with slow/fast speed select switch 179 which is adapted to be closed in the fast position. Thus full power is delivered to motor M2 of drive means 140 to operate chopper 40 in the first or high speed mode.

Also movable element 153 can be shifted to direct any material entering receptacle 145 into second zone 149 by shifting the auto/manual switch 177 to the manual position to energize scrap chute solenoid SV which operates movable element 153.

Assuming that one of the feeders 4, 5, or 6 is about to be restarted with at least one other feeder operating under normal production conditions the operator activates spring loaded control switch 175 which energizes relay CR2 to close contacts CR2-1 and CR-2. With contacts CR2-1 closed relay CR2 is locked in until contacts T1-M are opened as will be explained later. As the spring loaded control switch 175 automatically returns to the normal position timer T1 is energized such that coil C in timer T1 is energized as well as timing motor M. Coil C in timer T1 is not timed but acts similar to a conventional relay such that contacts T1-C are closed instantaneously upon the energization of timer T1 thus energizing relay CR3 and scrap chute solenoid SV. When scrap chute solenoid SV is energized, movable element 153 directs the chopped strand 31 into second collection zone 149, thus preventing any of the waste formed at the lower speed from contaminating the primary product.

The motor M2 of drive means 140 is shifted into the second or slower speed since contact CR3-1 opens when relay CR3 is energized. Thus the current must pass along resistors R1 and R2 located in series along one of the leads X3 and X4 leading to the motor to run the motor at the slower speed.

Timed motor relay M upon energization begins to count down for a preselected length of time. Contacts T1-M remain closed until timing motor M times out where upon contacts T1-M open thus denergizing relays CR2 and CR3.

Contacts T1-M remain open only for an instant, but timer T1 remains denergized since contacts CR2-2 have shifted to the open position because relay CR2 has been denergized. Thus, the movable element 153 in recepticle 145 is returned to the closed position permitting the chopped strand to move through the first zone 147. Simultaneously with the denergization of relay CR2, CR3 is denergized such that contact CR3-1 returns to the closed position to permit the chopper 40 to return to the high speed mode, assuming the speed select switch 179 is in the fast position. Thus, the system can continue to operate in the normal or high speed mode delivering chop strand 31 to the first zone 47 until the control switch 175 is activated again.

The contacts, relays, switches, timers, and motors employed herein can be of the type commercially available. For example, relays CR2 and CR3 can be Potter and Brumfield catalog Nos. KRP14AG, 3PDT, and KRP11AG, DPDT, respectively. Control switch 175 can be Square D Company push buttom class 9001 type KR25G. Stop switch 170 and start switch 172 can be a Square D Company, push button class 9001 type KR-1U. Timer T1 can be a Cyib-Flex reset timer type HP50A6, and the auto/manual switch can be Square D Company switch class 9001 catalog number KS-11B. The motor M2 for the drive means 140 can be of the DC drive Sencore model no. 2450P50013A.

It is apparent that within the scope of the invention, modifications and different arrangements can be made other than is here and disclosed. The present disclosure is merely illustrative with the invention comprehending all variations thereof.

We claim:

1. Apparatus comprising:
   a plurality of feeders adapted to supply a plurality of streams of molten glass;
   primary attenuation means adapted to attenuate the streams to filaments and cut the continuous filaments into discrete segments, said primary attenuation means having a drive means;
   recepticle means having a first collection zone and a second collection zone spaced from said first zone to receive the discrete segments; and
   control means adapted (a) to control the speed of said drive means to operate said primary attenuation means at a first speed or a second speed slower than the first speed, and (b) to direct the discrete fibers to the first zone when said primary attenuation means is operated at the first speed and direct the discrete segments to the second zone when said forming means is operated at said second speed.

2. The apparatus of claim 1 wherein said control means is adapted to reduce the speed of the primary attenuation means for a predetermined length of time before energizing the primary attenuation means to operate at said first speed.

3. The apparatus of claims 1 or 2 wherein said control means controls a movable element pivoted at one end at a wall separating the first and second zone adapted to direct said discrete segments to said first zone or said second zone.

4. The method of forming and collecting discrete segments of fibrous glass comprising:
   supply a plurality of streams of molten glass;
   attenuating the streams into filaments and cutting the continuous filaments into discrete segments by an attenuation means;
   positioning a delivery means having a first collection zone and a second collection zone spaced from the first zone to receive said discrete fibers;
   controlling said attenuation means to operate at a first speed or a second speed slower than the first speed; and
   directing the discrete segments to said first zone when said attenuation means is operated at said first speed and to said second zone when said forming means is operated at said second speed.

5. The method of claim 4 wherein the speed of the attenuation means is controlled to reduce the speed of said forming means from the first speed to the second speed for a predetermined length of time before returning to the first speed when said control means is activated.

* * * * *